US009280917B2

(12) United States Patent
Parry, Jr. et al.

(10) Patent No.: US 9,280,917 B2
(45) Date of Patent: Mar. 8, 2016

(54) SIMULANT WITH VASCULAR ELEMENT MECHANICALLY RESPONSIVE TO A TOURNIQUET

(71) Applicant: Techline Technologies, Inc., Willow Grove, PA (US)

(72) Inventors: David J. Parry, Jr., Yardley, PA (US); Daniel J. Parry, Perkasie, PA (US); Meredith K. Fiedler, Laverock, PA (US); Jonathan A. Closeme, Philadelphia, PA (US); David W. Thompson, Southampton, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 268 days.

(21) Appl. No.: 13/925,949

(22) Filed: Jun. 25, 2013

(65) Prior Publication Data

US 2013/0288216 A1    Oct. 31, 2013

Related U.S. Application Data

(63) Continuation-in-part of application No. 13/532,848, filed on Jun. 26, 2012, now Pat. No. 8,491,309, which is a continuation-in-part of application No. 12/131,980, filed on Jun. 3, 2008, now Pat. No. 8,221,129.

(60) Provisional application No. 61/681,856, filed on Aug. 10, 2012.

(51) Int. Cl.
*G09B 23/28* (2006.01)
*G09B 23/30* (2006.01)
*G09B 9/00* (2006.01)

(52) U.S. Cl.
CPC ............. *G09B 23/30* (2013.01); *G09B 9/003* (2013.01)

(58) Field of Classification Search
USPC ........................................... 434/272
See application file for complete search history.

(56) References Cited

U.S. PATENT DOCUMENTS

| | | | |
|---|---|---|---|
| 2,752,697 A | 7/1956 | Lawall | |
| 2,945,304 A | 4/1959 | Niiranen et al. | |
| 3,027,655 A | 9/1959 | Alderson | |
| 3,307,873 A * | 3/1967 | Blaszkowski | 297/474 |
| 3,852,893 A | 12/1974 | Smrcka | |
| 5,775,916 A * | 7/1998 | Cooper et al. | 434/267 |
| 8,221,129 B2 | 7/2012 | Parry et al. | |
| 2009/0011394 A1 | 1/2009 | Meglan et al. | |
| 2012/0276511 A1 | 11/2012 | Parry et al. | |

\* cited by examiner

*Primary Examiner* — Sam Yao
*Assistant Examiner* — Evan Page
(74) *Attorney, Agent, or Firm* — Michael G. Crilly, Esquire

(57) ABSTRACT

A medical simulant applicable to training personnel in the treatment of a traumatic injury is presented. The simulant replicates the appearance of a body part and is mechanically responsive to externally applied pressure so as to mimic the response of a vascular element when a tourniquet or the like is applied to the body part. The simulant includes a compressible body, a structure, a compressible tube, and a pair of plates. The compressible body replicates an arm, a leg, or another body region. The structure replicates an injury, either penetrating or non-penetrating, and is disposed along the compressible body. The compressible tube replicates a vascular element. The plates are separately disposed within the compressible body about the compressible tube. The plates are configured to deform the compressible tube so as to interrupt flow of a liquid simulating blood therein when a compressive force is applied onto the compressible body by a tourniquet or the like.

18 Claims, 11 Drawing Sheets

SIMULANT WITH VASCULAR ELEMENT MECHANICALLY RESPONSIVE TO A TOURNIQUET

CROSS REFERENCE TO RELATED APPLICATIONS

This application claims priority to Provisional Application No. 61/681,856 filed Aug. 10, 2012 entitled Simulant with Vascular Structure Mechanically Responsive to a Tourniquet; this application is also a continuation-in-part of co-pending U.S. Non-Provisional application Ser. No. 13/532,848 filed Jun. 26, 2012 entitled Wearable Wound Simulant which is a continuation-in-part of U.S. Non-Provisional application Ser. No. 12/131,980 filed Jun. 3, 2008 entitled Wearable Wound Simulant now U.S. Pat. No. 8,221,129; all prior applications are hereby incorporated in their entirety by reference thereto.

FEDERALLY SPONSORED RESEARCH AND DEVELOPMENT

None.

BACKGROUND OF THE INVENTION

1. Field of the Invention

The invention generally relates to a simulant which replicates the appearance and tactile properties of a limb or other body region for medical training purposes. Specifically, the invention is a simulant of a body part including a structure therein which allows a compressible tube representative of a vascular element to be mechanically deformed by a tourniquet thus interrupting flow of a liquid simulating blood within the compressible tube.

2. Background

Mannequins and wearable simulants are commonly used to train soldiers on how to properly treat combat-related trauma. The purpose of this training is to instill the skills required to stabilize the medical condition of a wounded soldier before or during transport to a hospital. Mannequins and wearable simulants replicate the appearance and tactile properties of flesh, tissues, and organs, as well as penetrating and non-penetrating injuries thereto. Many such training devices include tubes which allow a liquid simulating blood to flow to and out of an injury representative of a penetrating wound or to pool within tissues when the injury is a non-penetrating wound. The combination of visual, tactile, and functional properties ensure a more realistic representation of an injury.

Training devices with vascular elements are sometimes employed to instill the skills and knowledge required for proper use of a tourniquet to stop blood loss after a traumatic injury. Presently know training devices are problematic for at least the following reasons.

Some training devices includes a compressible material with a tube therein which are mechanically responsive to a tourniquet. Unfortunately, such devices often fail to realistically replicate the mechanical response of human tissues and vascular elements when a tourniquet is applied. For example, it is common for the compressible materials surrounding a vascular simulant to locally move in the direction of the applied force thus compressing the material surrounding the vascular simulant without closing the vascular simulant and choking blood flow. The result is functionality which does not accurately correspond to the mechanical response of a body part to a tourniquet, thus negating the training value of the device.

Other training devices simulate the effects of a tourniquet without duplicating the mechanical response of tissues and vascular structures. For example, it is common for a sensor to be embedded within a training device adjacent to a vascular simulant. The sensor measures the magnitude of a force applied to a training device adjacent to a vascular simulant. Force data is processed and blood flow and pressure adjusted so as to simulate the flow conditions associated with collapse and closure of a vascular structure. Unfortunately, sensors, electronics, and pumping means increase the cost of such training devices. Furthermore, sensors, electronics, and pumps are prone to damage and failure. Also, sensors, electronics, and pumps require a power source. Finally, such training devices at best approximate the end results of a tourniquet via electronic means rather than the mechanical causes, thereby reducing the instructional value of these devices.

Accordingly, what is required is a simulant of a body part with a vascular element which is mechanically responsive to a tourniquet so as to compress and collapse the vascular element thereby choking blood flow there through.

Accordingly, what is required is a simulant of a body part with a vascular element which avoids sensors, electronics, and pumping means to replicate closure of the vascular element in response to the force applied by a tourniquet.

Accordingly, what is required is a simulant of a body part with a vascular element which avoids a power supply to replicate closure of the vascular element in response to the force applied by a tourniquet.

Accordingly, what is required is a simulant of a body part with a vascular element which replicates the mechanical response within the simulant adjacent to a vascular element and in doing so mechanically duplicates closure of the vascular element and interrupts blood flow there through.

SUMMARY OF THE INVENTION

An object of the invention is a simulant of a body part with a vascular element which is mechanically responsive to a tourniquet so as to compress and collapse the vascular element thereby choking blood flow there through.

An object of the invention is a simulant of a body part with a vascular element which avoids sensors, electronics, and pumping means to replicate the closure of the vascular element in response to the force applied by a tourniquet.

An object of the invention is a simulant of a body part with a vascular element which avoids the need for a power source to replicate closure of the vascular element in response to the force applied by a tourniquet.

An object of the invention is a simulant of a body part with a vascular element which replicates the mechanical response within the simulant adjacent to a vascular element and in doing so mechanically duplicates closure of the vascular element and interruption of blood flow there through.

In accordance with embodiments of the invention, the simulant includes a compressible body, a structure, a compressible tube, and a pair of plates. The compressible body replicates the appearance and tactile properties of a body part. The structure replicates an injury, either penetrating or non-penetrating, and is disposed along the compressible body. The compressible tube replicates a vascular element, examples including but not limited to an artery or a vein. The plates are disposed within the compressible body and are separately disposed about the compressible tube. The plates are configured to deform the compressible tube when a compressive force is applied onto the compressible body by a tourniquet or the like.

In accordance with other embodiments of the invention, the plates are the same length.

In accordance with other embodiments of the invention, the plates are different lengths.

In accordance with other embodiments of the invention, at least one plate has an uneven surface and a portion of each uneven surface contacts the compressible tube.

In accordance with other embodiments of the invention, a tear resistant layer is disposed within the compressible body. The tear resistant layer is less stretchable than the elastic limit of the compressible body so as to resist over-stretch and failure of the compressible body.

In accordance with other embodiments of the invention, the tear resistant layer is pre-stressed to apply a compressive load onto the compressible body so as to resist over-stretch and failure of the compressible body.

In accordance with other embodiments of the invention, the tear resistant layer is a fabric.

In accordance with other embodiments of the invention, the compressible body replicates a leg in part or whole.

In accordance with other embodiments of the invention, the compressible body replicates an arm in part or whole.

In accordance with other embodiments of the invention, the compressible body is attachable to a mannequin.

In accordance with other embodiments of the invention, an insert is disposed within the compressible body for attachment purposes or to replicate a bone.

In accordance with other embodiments of the invention, one end of the insert extends from the compressible body and is attachable to a mannequin.

In accordance with other embodiments of the invention, the insert includes a plurality of holes and a portion of the compressible body fills the holes to further secure the insert to the compressible body.

In accordance with other embodiments of the invention, the insert includes a plurality of holes and a tear resistant strip is secured to the holes. The compressible body is attached to the tear resistant strip to further secure the insert to the compressible body.

In accordance with other embodiments of the invention, the tear resistant strip is a fabric.

In accordance with other embodiments of the invention, the compressible body comprises a silicone.

In accordance with other embodiments of the invention, the compressible tube comprises a silicone.

In accordance with other embodiments of the invention, each plate comprises a urethane.

Several advantages are offered by the invention. The invention provides an electronics-free solution which replicates the mechanical response of tissues and a vascular element when a tourniquet or the like is applied to a body part to interrupt blood flow therein. The invention includes plates which are readily removable and replaceable, thus allowing the end user to adjust the sensitivity and response of the invention to externally applied pressure. The invention provides multiple choke points along a compressible tube thereby ensuring complete interruption of the flow of a blood simulant through the vascular simulant.

The above and other objectives, features, and advantages of the preferred embodiments of the invention will become apparent from the following description read in connection with the accompanying drawings, in which like reference numerals designate the same or similar elements.

| REFERENCE NUMERALS | |
|---|---|
| 1 | Simulant |
| 2 | Exterior surface |
| 3 | Compressible body |
| 4 | Core |
| 5 | Cavity |
| 6 | Outer plate |
| 7 | Inner plate |
| 8 | Tube |
| 9 | Space |
| 10 | Liquid |
| 11 | Uneven surface |
| 12 | Tear resistant layer |
| 13 | Compression force |
| 14 | Choke point |
| 20 | Mold |
| 21 | Mold cap |
| 22 | Mold wall |
| 23 | Cavity |
| 24 | Mandrel |
| 25 | Threaded rod |
| 26 | Nut |
| 27 | Channel |
| 28 | Insert |
| 30 | Hole |
| 31 | Rim |
| 32 | Mating surface |
| 33 | First side |
| 34 | Second side |
| 35 | Tear resistant strip |
| 36 | Flange |
| 37 | Hole |
| 38 | Flange |
| 39 | Fastener |
| 40 | Hole |
| 41 | Hole |
| 42 | Injury |
| 43 | Hole |
| 44 | Hole |
| 45 | Hole |
| 46 | End cap |

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1:
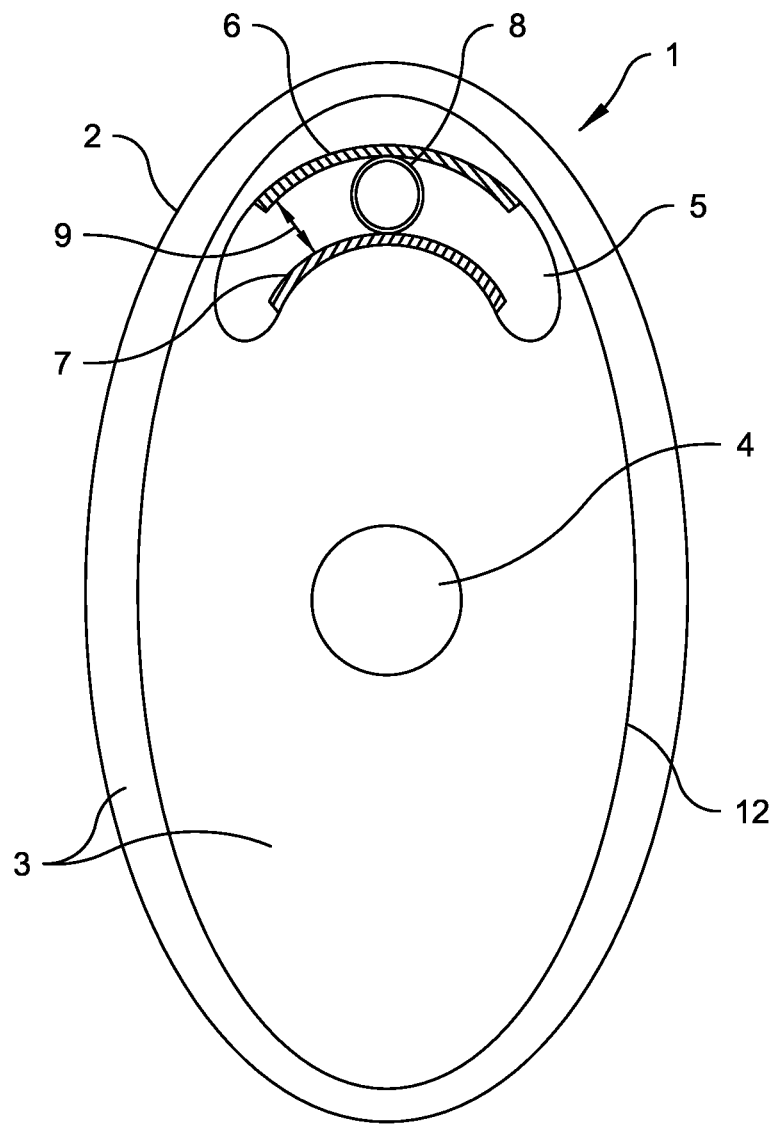
FIG. 1 is a cross section view illustrating a simulant of a body part with a tube therein replicating a vascular element and a pair of plates disposed about the tube and configured to enable the tube to be mechanically responsive to a tourniquet in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not to precise scale.

While features of various embodiments are separately described throughout this document, it is understood that two or more such features could be combined into a single embodiment.

The molded and mold parts described herein are fabricated via cast methods understood in the art.

Figure 2:
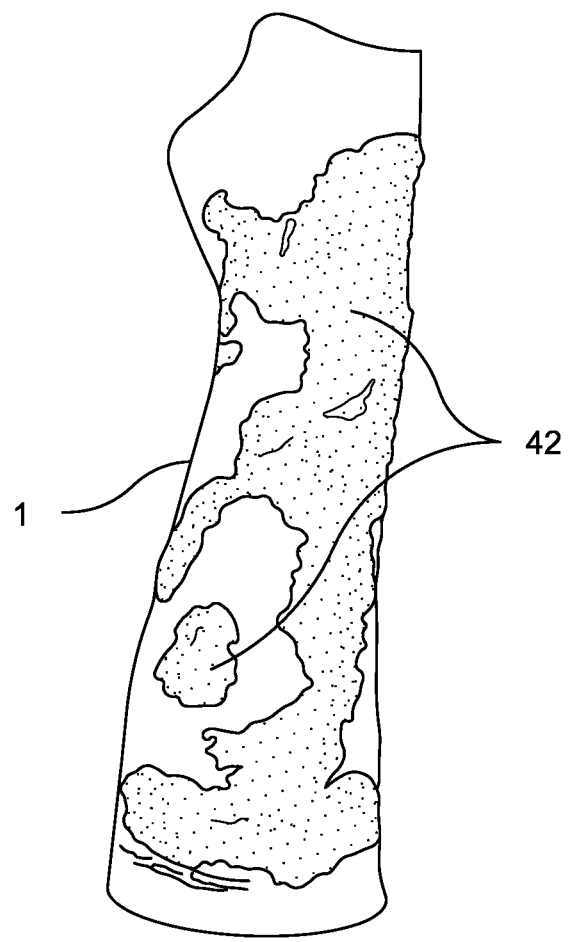
FIG. 2 is a side elevation view illustrating a simulant in the general shape of an arm or a leg including a structure which replicates an injury in accordance with an embodiment of the invention.

Referring now to FIGS. 1 and 2, a simulant 1 is shown including a compressible body 3 with an injury 42. The compressible body 3 could be composed of one or more layers of one or more polymer materials, one non-limiting example being silicone. In one example, the outermost part of compressible body 3 immediately below the exterior surface 2 could include one or more layers with pigmentation, as described in U.S. Pat. No. 8,221,129 entitled Wearable Wound Simulant which is incorporated in its entirety by reference thereto, and the inner most portion of the compressible body 3 could be a single cold cast resin without pigmentation. The compressible body 3 should deform when a force is applied onto the exterior surface 2, yet be sufficiently resilient to recover its original shape after the force is removed. The compressible body 3 is shaped to approximate the appearance of a body part, examples including but not limited to an arm with or without hand, a leg with or without a foot, or other region, as generally depicted in FIG. 2. In some embodiments, the compressible body 3 could include a core 4 which simulates a bone. The dimensions, namely, length and diameter, rigidity, and location of the core 4 within the compressible body 3 are dictated by the anatomical properties of the structure approximated by the core 4.

Referring again to FIG. 1, the compressible body 3 could include one or more tear resistant layers 12 embedded within the compressible body 3. The tear resistant layers 12 are positioned within the compressible body 3 at one or more depths. Each tear resistant layer 12 is a woven structure or the like, which is flexible, stretchable, and resilient, composed of natural or synthetic fibers, one non-limiting example being polyester. The tear resistant layer 12 could be porous before and/or after stretch. In preferred embodiments, the fabric is a stretchable, porous fabric. The tear resistant layer 12 is impregnated with the resin comprising the compressible body 3 to ensure a secure bond between the compressible body 3 and tear resistant layer 12. In some embodiments, it might be advantageous for the tear resistant layer 12 to be pre-stretched to a level less than its maximum stretch prior to application of a polymer. The resultant pre-stressed structure would ensure compressive loading within the cured resin.

Figure 3:
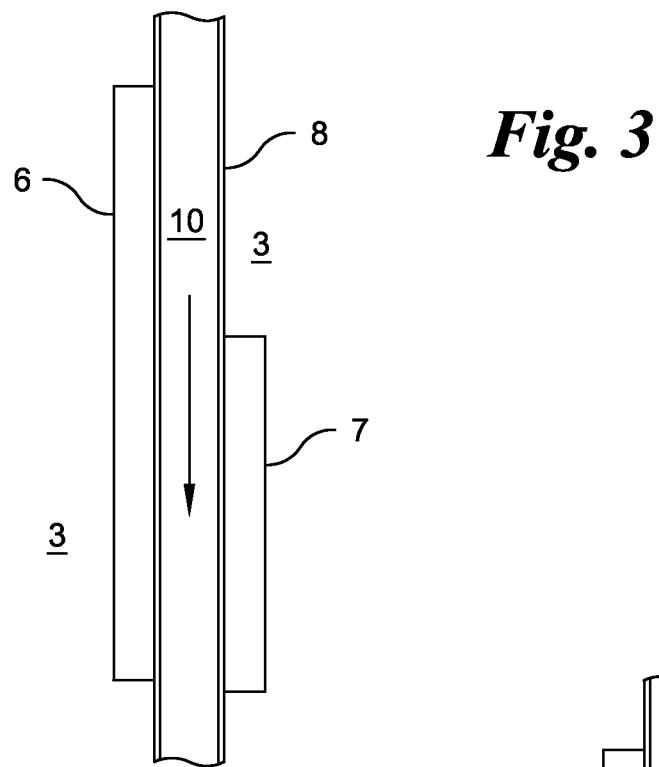
FIG. 3 is an enlarged cross section view illustrating a tube replicating a vascular element disposed between a pair of plates within a compressible body which approximates a body part whereby the plates differ lengthwise in accordance with an embodiment of the invention.

Referring again to FIG. 1, the compressible body 3 further includes a cavity 5 molded into the interior of the compressible body 3. The cavity 5 should be sufficiently voluminous so as to accommodate an outer plate 6, an inner plate 7, and a tube 8. The cavity 5 is positioned within the compressible body 3 and dimensioned to approximate the location at which a tourniquet could arrest blood loss from an injury 42 replicated by the simulant 1. One side of the cavity 5 could generally conform to the outer most profile of the outer plate 6 and the other side of the cavity 5 could generally conform to the inner most profile of the inner plate 7 so that each plate 6, 7 is supported along its length and width by the compressible body 3. The outer and inner plates 6, 7 could include a generally linear profile lengthwise along the tube 8, as represented in FIG. 3, and could include a curved or arcuate profile perpendicular to the tube 8, as represented in FIG. 1. The outer and inner plates 6, 7 are preferred to be rigid and hard.

In one non-limiting example, the outer and inner plates 6, 7 could be composed of a cold cast urethane resin fabricated via techniques understood in the art.

Referring again to FIG. 1, at least one tube 8 is provided within and secured to the compressible body 3. The tube 8 should be deformable so as to collapse when a compressive force is applied thereto and resilient so as to recover its original shape after a compressive force is removed, thus approximating the deformation and resiliency of a vascular element. The tube 8 could be composed of a polymer material, one non-limiting example being a silicone. The length, diameter, compressibility, resiliency, and location within the compressible body 3 of the tube 8 are dictated by the anatomical properties of the vascular element simulated by the tube 8. For example, the tube 8 could be located and dimensioned to approximate a femoral artery within a simulant 1 approximating a leg or a brachial artery within a simulant 1 approximating an arm. The outer and inner plates 6, 7 are likewise positioned within the respective simulant 1 to mechanically approximate pressure points known to stop blood flow through the operative vascular element within an arm, a leg, or other body part.

Figure 13:
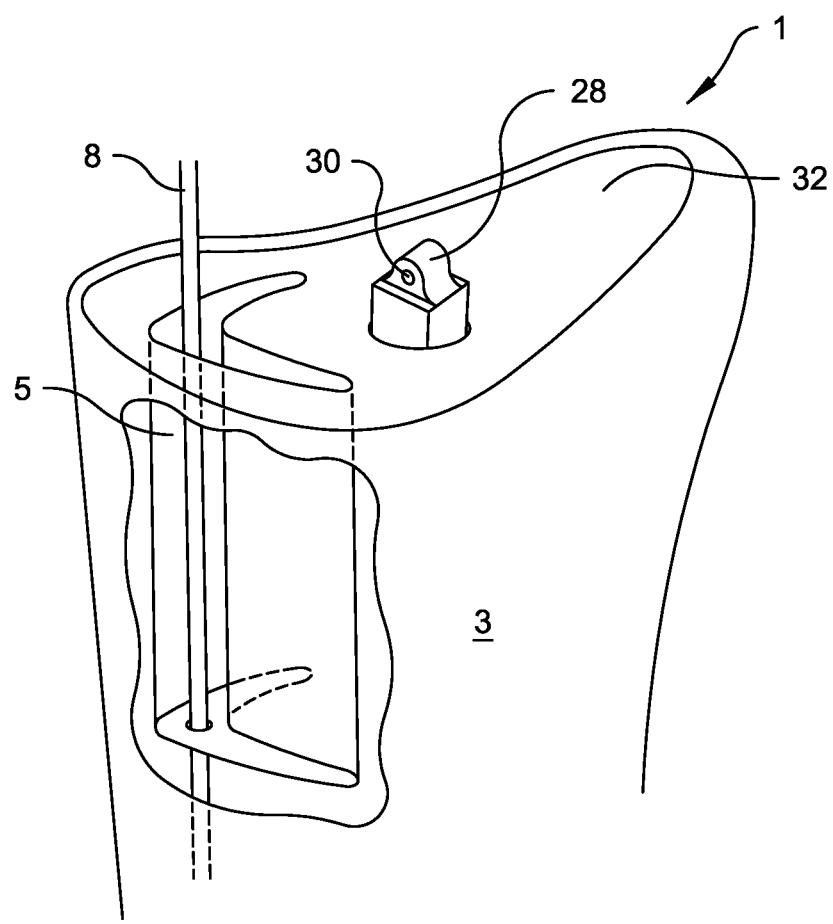
FIG. 13 is a perspective view with partial interior view illustrating a simulant with a cavity and tube therein after removal of a mandrel and an optional insert extending from the mating surface at one end of the simulant in accordance with an embodiment of the invention.

Referring again to FIG. 1, a portion of the tube 8 is disposed within and traverses the cavity 5. Another portion of the tube 8 is embedded within and secured to the compressible body 3, as generally represented in FIG. 13. The tube 8 is positioned within the space 9 between the outer and inner plates 6, 7. The space 9 ensures that a compressive force applied along the exterior surface 2 toward the compressible body 3 is communicated onto the outer plate 6 causing the outer plate 6 to move toward the tube 8 thereby deforming and collapsing a portion of the tube 8. The inner plate 7 resists compression of the compressible body 3 immediately below the tube 8 thereby ensuring collapse and closure of the tube 8. The result is a pinching of the tube 8 between the outer and inner plates 6, 7. The tube 8 could terminate at or near an injury 42 so as to simulate bleeding and blood loss.

Figure 4:
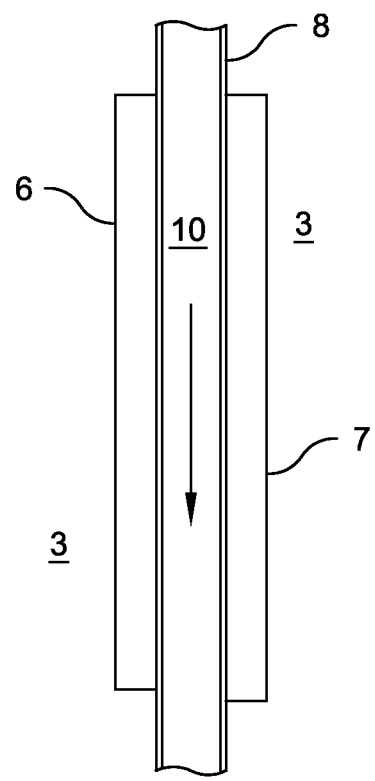
FIG. 4 is an enlarged cross section view illustrating a tube replicating a vascular element disposed between a pair of plates within a compressible body which approximates a body part whereby the plates are approximately the same length in accordance with an embodiment of the invention.
Figure 5:
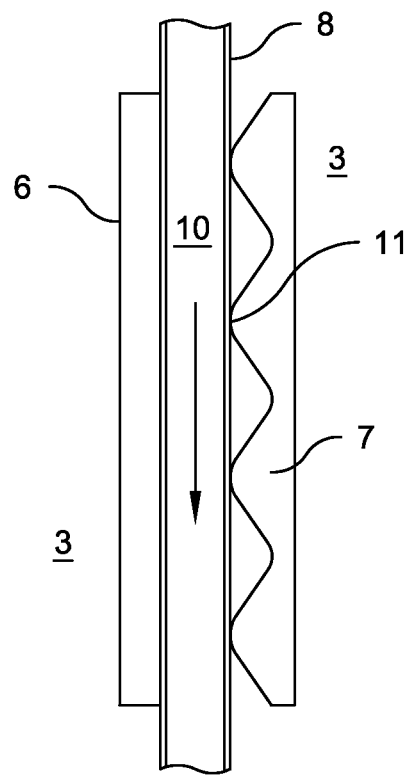
FIG. 5 is an enlarged cross section view illustrating a tube replicating a vascular element disposed between a pair of plates within a compressible body which approximates a body part whereby one plate has an uneven surface and another plate has a flat or even surface that contact the tube in accordance with an embodiment of the invention.
Figure 6:
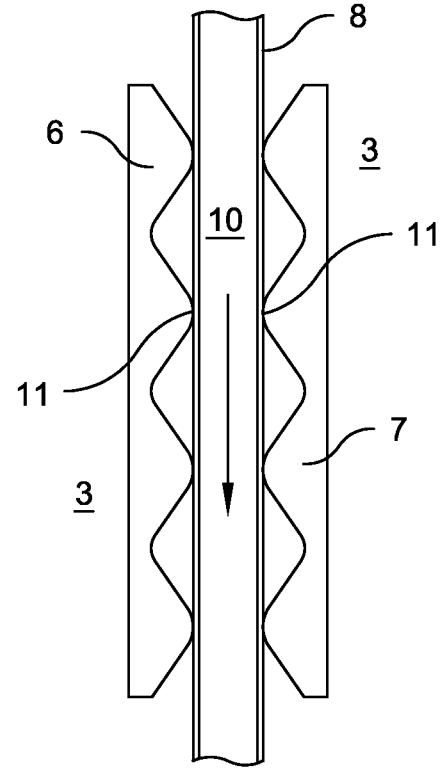
FIG. 6 is an enlarged cross section view illustrating a tube replicating a vascular element disposed between a pair of plates within a compressible body which approximates a body part whereby both plates have an uneven surface that contact the tube in accordance with an embodiment of the invention.

Referring now to FIGS. 3-6, a tube 8 is shown disposed between an outer plate 6 and an inner plate 7 with a liquid 10 flowing through the tube 8. The outer plate 6, inner plate 7, and tube 8 are disposed within the compressible body 3 as otherwise described. In some embodiments, it might be advantageous for the outer and inner plates 6, 7 to have different lengths, as represented in FIG. 3 While the outer plate 6 is shown longer than the inner plate 7, the opposite arrangement is likewise possible. In other embodiments, it might be advantageous for the outer and inner plates 6, 7 to have the same or substantially similar lengths, as represented in FIG. 4. In yet other embodiments, the inner plate 7 could include an uneven surface 11 which intermittently contacts the tube 8, as presented in FIG. 5. While the inner plate 7 is shown with an uneven surface 11, it is understood that the uneven surface 11 could reside along the outer plate 6 only. In still another embodiment, the outer and inner plates 6, 7 could include uneven surfaces 11 so that both plates 6, 7, intermittently contact the tube 8, as represented in FIG. 6. In preferred embodiments, the contact points along the opposed uneven surfaces 11 could be aligned as shown in FIG. 6; although other arranges are possible. An uneven surface 11 could include waves or other features which vary the thickness of an outer or inner plate 6, 7. The uneven surface 11 is preferred to include high and low regions which effectively increase the sensitivity of a simulant 1 to the mechanical action of a tourniquet. In preferred embodiments, the tube 8 is disposed between the outer and inner plates 6, 7 so as to contact the tube 8 prior to application of a compressive force, as represented in FIG. 3-6. The tube 8 could move or flex sideways between the outer and inner plates 6, 7 perpendicular to the length of the simulant 1, as represented by the view in FIG. 1.

Figure 7A:
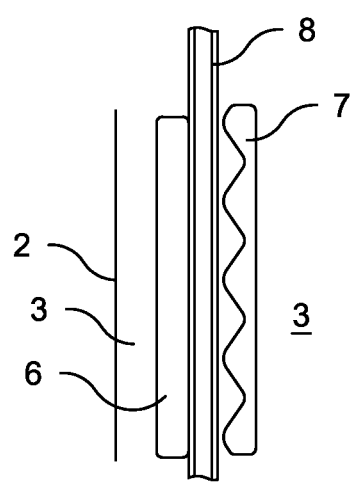
FIG. 7a is a lengthwise section view illustrating a tube replicating a vascular element disposed between a pair of plates within a compressible body which approximates a body part prior to application of a compressive force whereby one plate has an uneven surface and another plate has an uniform surface that contact the tube in accordance with an embodiment of the invention.
Figure 8A:
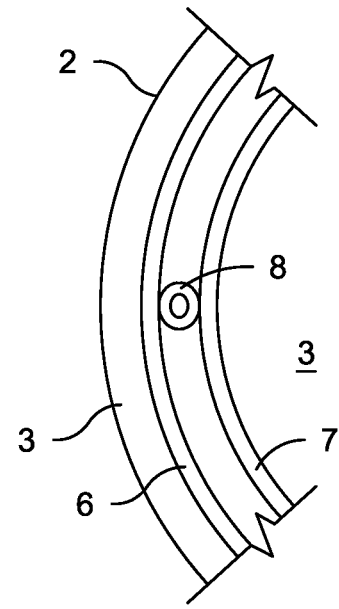
FIG. 8a is a diametrical section view illustrating a tube replicating a vascular element disposed between a pair of plates within a compressible body which approximates a body part prior to application of a compressive force wherein one plate has an uneven surface and another plate has a uniform surface that contact the tube in accordance with an embodiment of the invention.

Referring now to FIGS. 7a and 8a, outer and inner plates 6, 7 are disposed about and contact a tube 8 prior to application of a compressive force. While both plates 6, 7, contact the tube 8, the tube 8 substantially retains its cross-sectional shape allowing for the passage of a liquid 10.

Figure 7B:
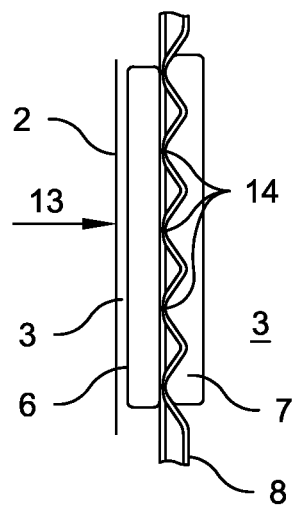
FIG. 7b is a lengthwise section view illustrating a tube replicating a vascular element disposed between a pair of plates within a compressible body which approximates a body part wherein one plate has an uneven surface and another plate has a uniform surface whereby the plates deform and close the tube during application of a compressive force resulting in choke points along the tube in accordance with an embodiment of the invention.
Figure 8B:
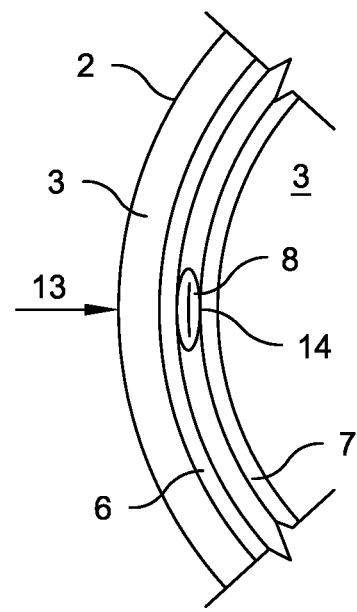
FIG. 8b is a diametrical section view illustrating a tube disposed between a pair of plates within a compressible body which approximates a body part wherein one plate has an uneven surface and another plate has an uniform surface whereby the plates deform and close the tube during application of a compressive force resulting in choke points along the tube in accordance with an embodiment of the invention.

Referring now to FIGS. 7b, 8b, a compressive force 13 is applied to the exterior surface 2 along the compressible body 3 causing the outer plate 6 to move inward toward the tube 8 thereby deforming the wall of the tube 8. Flow through the tube 8 ceases when the tube 8 is pinched between the outer and inner plates 6, 7 thereby closing the tube 8 at several choke points 14 and impeding the flow of liquid 10 there through, as represented in FIGS. 7b and 8b. If the outer and inner plates 6, 7 have flat or uniform surfaces rather than uneven surfaces 11, then one choke point 14 is more likely. The force required to collapse and close the tube 8 could approximate the value associated with the vascular element replicated with the compressible body 3.

Figure 9:
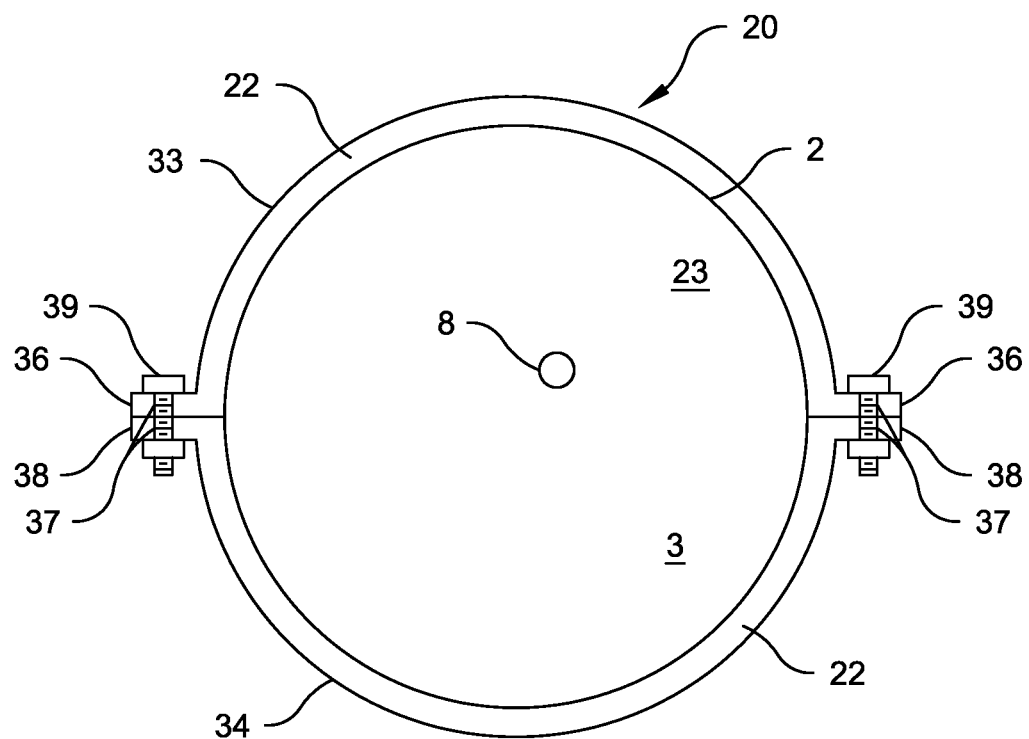
FIG. 9 is a cross section view illustrating first and second sides of an exemplary mold for use in the manufacture of a simulant in accordance with an embodiment of the invention.
Figure 10:
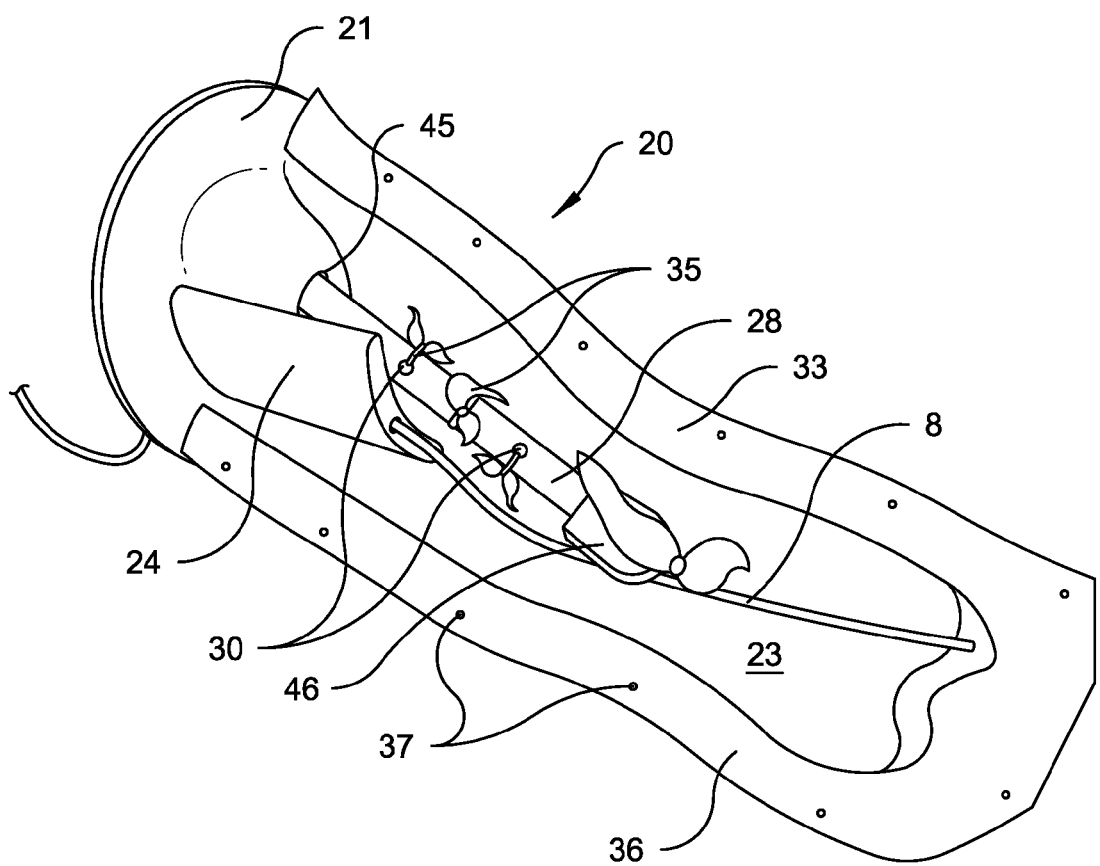
FIG. 10 is a cross section view illustrating one side of an exemplary mold with a mold cap and a mandrel for use in the manufacture of a simulant whereby an optional insert and a tube are disposed within the mold and the tube passes through the mandrel and mold cap in accordance with an embodiment of the invention.

Referring now to FIGS. 9 and 10, the first and second sides 33, 34 of a three-part mold 20 are shown. The first and second sides 33, 34 include a pair of flanges 36, 38, respectively, disposed about the sides and bottom thereof. The flanges 36, 38 are mutually positioned and aligned when the first and second sides 33, 34 contact. This arrangement leaves the top end of the mold 20 open. The first and second sides 33, 34 are secured via a plurality of fasteners 39, one non-limiting example being a bolt and nut combination. Each fastener 39 resides within and extends through a pair of mutually aligned holes 37 and traverses the thickness of the flanges 36, 38. Each fastener 39 is secured to the flanges 36, 38 thereby closing the joint formed between the flanges 36, 38. The mold walls 22 comprising the first and second side 33, 34 generally define the cavity 23 within the mold 20. The profile of the cavity 23 substantially defines the exterior surface 2 of the compressible body 3 with tube 8 therein.

Figure 11:
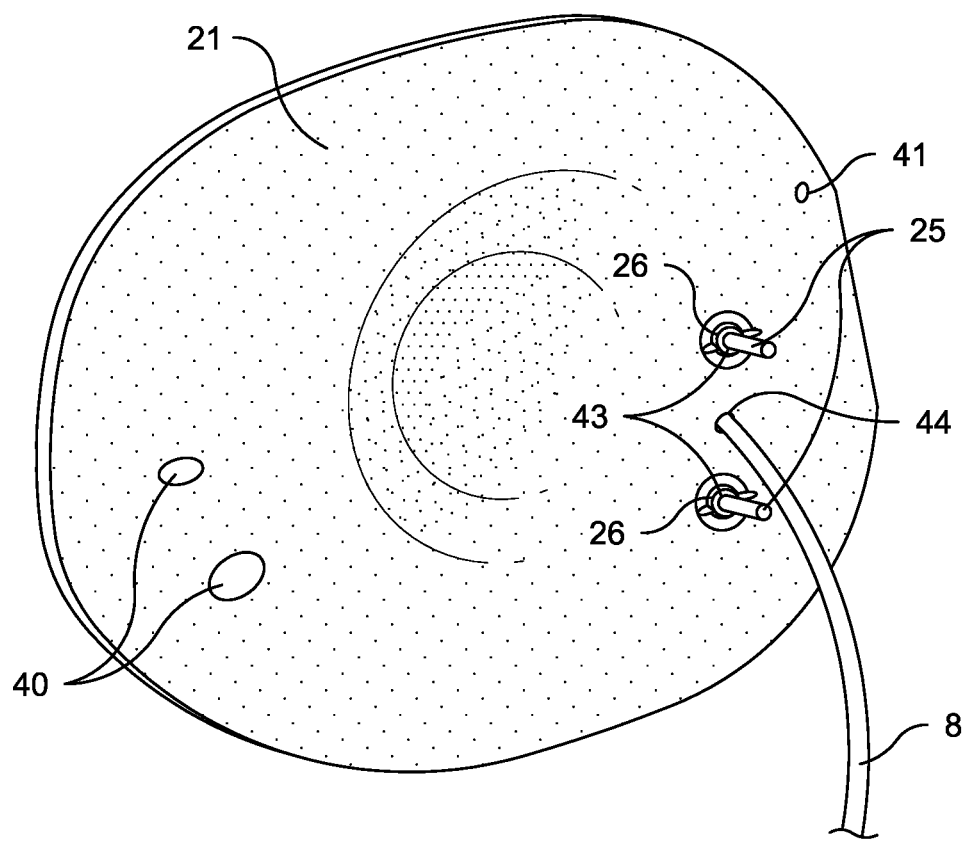
FIG. 11 is top view illustrating an exemplary mold cap attached to an exemplary mold for use in the manufacture of a simulant in accordance with an embodiment of the invention.
Figure 12:
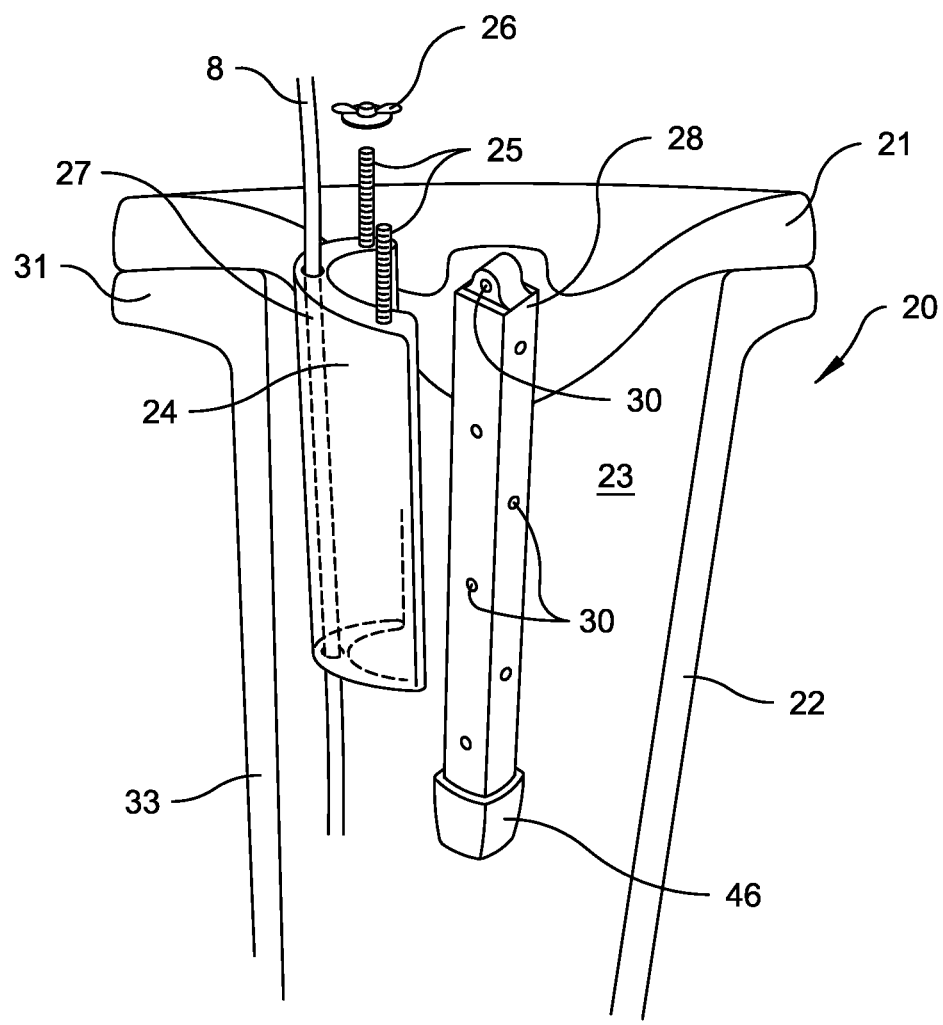
FIG. 12 is a perspective view with partial interior view illustrating an exemplary mold with a mold cap and a mandrel for use in the manufacture of a simulant configured with an optional insert in accordance with an embodiment of the invention.

Referring now to FIGS. 10-12, the open end of the mold 20 contacts a mold cap 21 which encloses the mold 20. The mold cap 21 has holes 40 which allow a resin to be poured into the mold 20 so as to form the compressible body 3. The mold cap 21 also includes one or more holes 41 which allow the mold cap 21 to be secured to the rim 31 via fasteners 39 (the latter not shown along the rim 31), as otherwise described herein. One or more pigmented layers of compressible resin with or without tear resistant layer 12 could be applied to the inner surfaces of the first and second sides 33, 34 prior to assembly of the mold 20. Resin is then poured into the mold 20 so as to bond to the pigmented layers along the walls 22. Prior to casting, the interior surface along the first side 33, second side 34 and mold cap 20 and exterior surface along the mandrel 24 could be coated with a mold release agent or lubricant.

Referring again to FIGS. 10-12, a mandrel 24 is attached to the mold cap 21. The mandrel 24 is dimensioned and shaped so as to form the cavity 5 within the compressible body 3. The mandrel 24 is a rigid element with a pair of threaded rods 25 embedded therein which extend from one end thereof. The mandrel 24 could be composed of a cold cast epoxy. A channel 27, one non-limiting example being a metal tube or sleeve, is disposed within and completely traverses the mandrel 24. A portion of the channel 27 could extend from one end of the mandrel 24 for insertion into a hole 44 along the mold cap 21. A tube 8 is inserted into and through the channel 27 so that one end of the tube 8 extends into the cavity 23 and a second end extends through the mold cap 21 when the mandrel 24 is assembled onto the mold 20. The mandrel 24 is secured to the mold cap 21 by inserting the threaded rods 25 separately through a pair of holes 43 along the mold cap 21. A nut 26 is used to secure each threaded rod 25 to the mold cap 21. The tube 8 passes through the hole 44 along the mold cap 21 so that a portion of the tube 8 resides within the mold 20 and another portion resides outside of the mold 20.

Referring again to FIGS. 10-12, an insert 28 could also contact and extend from a hole 45 through the mold cap 21. The insert 28 could be a bone simulant or a frame-like member comprising a hollow tube, the latter represented in FIGS. 10 and 12, which facilitates attachment of the simulant 1 to a mannequin.

Referring again to FIGS. 10-12, the insert 28 could include a plurality of holes 30 that allow resin to infiltrate the insert 28 during cast of the compressible body 3. In some embodiments, a tear resistant strip 35 could be inserted into one hole 30 and out of another hole 30 and the tear resistant strip 35 secured to the insert 28. The tear resistant strip 35 could be a material as described herein for the tear resistant layer 12. The tear resistant strip 35 is impregnated with silicone during casting to ensure a secure bond between the compressible body 3 and the insert 28. An end cap 46 could be secured to the lower end of the insert 28 to avoid damage to the compressible body 3 by the insert 28.

Referring now to FIG. 13, a simulant 1 is shown removed from a mold 20 after the resin is cured and the compressible body 3 is properly formed. The compressible body 3 could include a mating surface 32, formed by the mold cap 21, which is shaped and contoured to facilitate attachment to a mannequin. The insert 28 could extend from the compressible body 3 above the mating surface 32. A hole 30 or other features could be provided along the insert 28 to facilitate attachment to a mannequin. The cavity 5 is positioned so as to be accessible from mating surface 32; however, other arrangements are possible. A tube 8 could extend through the compressible body 3 into and through the cavity 5 for attachment to a reservoir or pump (not shown) within or external to the simulant 1.

Figure 14:
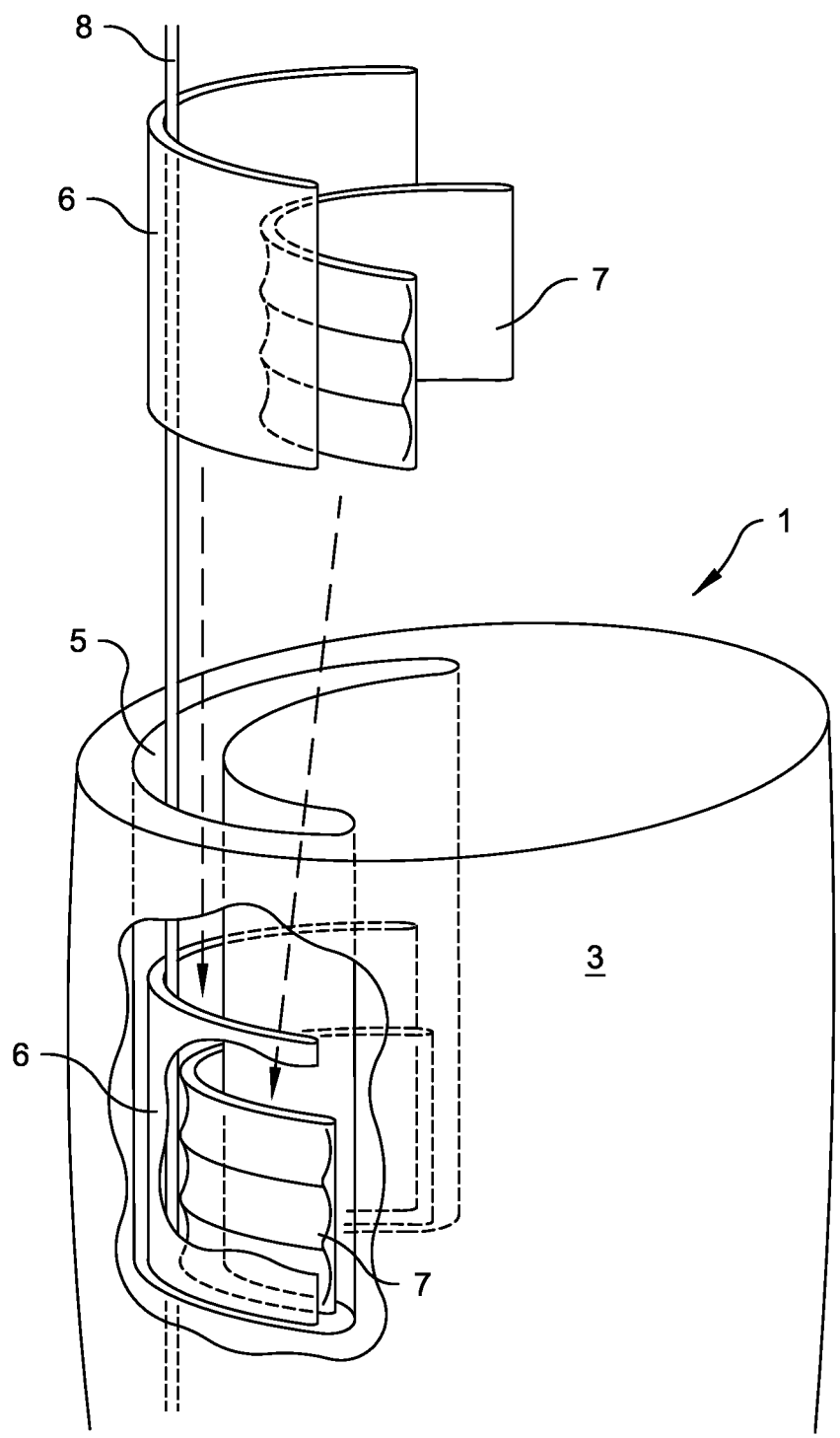
FIG. 14 is a perspective view with partial interior view illustrating a simulant comprising a compressible body with a cavity therein and a pair of plates prior to and after insertion into the cavity about a tube in accordance with an embodiment of the invention.

Referring now to FIG. 14, a simulant 1 is shown prior to assembly with the outer and inner plates 6, 7. The outer and inner plates 6, 7 are inserted into the cavity 5 so as to reside therein. The outer and inner plates 6, 7 could completely or partial fill the cavity 5. In some embodiments, the cavity 5 could be dimensioned so that the outer and inner plates 6, 7 freely float within the cavity 5 about the tube 8. In other embodiments, the cavity 5 could be dimensioned with a clearance fit so that the plates 6, 7 are loosely packed within the cavity 5 about the tube 8 or interference fit so that the plates 6, 7 are tightly packed within the cavity 5 about the tube 8.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A simulant mechanically responsive to a tourniquet for medical training purposes comprising:
    (a) a compressible body which replicates a body part;
    (b) a structure which replicates an injury disposed along said compressible body;
    (c) a compressible tube which replicates a vascular element; and
    (d) a pair of plates completely disposed within a cavity and separately disposed about said compressible tube, said cavity disposed within said compressible body, said compressible body contacts and supports each said plate so that each said plate is disposed between said compressible tube and said compressible body, said plates configured to deform said compressible tube when a compressive force is applied onto said compressible body.

2. The simulant of claim 1, wherein said plates are same length.

3. The simulant of claim 1, wherein said plates are different lengths.

4. The simulant of claim 1, wherein at least one said plate has an uneven surface immediately adjacent to said compressible tube.

5. The simulant of claim 1, further comprising:
    (e) a tear resistant layer disposed within said compressible body, said tear resistant layer less stretchable than elastic limit of said compressible body so as to prevent failure of said compressible body.

6. The simulant of claim 5, wherein said tear resistant layer is pre-stressed to compressively load said compressible body.

7. The simulant of claim 5, wherein said tear resistant layer is a fabric.

8. The simulant of claim 1, wherein said body part replicates a leg.

9. The simulant of claim 1, wherein said body part replicates an arm.

10. The simulant of claim 1, wherein said compressible body is attachable to a mannequin.

11. The simulant of claim 1, further comprising:
    (e) an insert disposed within said compressible body adjacent to said plates, said insert is a bone simulant or a frame-like member.

12. The simulant of claim 11, wherein one end of said insert extends from said compressible body and is attachable to a mannequin.

13. The simulant of claim 11, wherein said insert includes a plurality of holes, a portion of said compressible body fills said hole.

14. The simulant of claim 11, wherein a tear resistant strip is directly attached to said compressible body and said insert.

15. The simulant of claim 14, wherein said tear resistant strip is a fabric.

16. The simulant of claim 1, wherein said compressible body comprises a silicone.

17. The simulant of claim 1, wherein said compressible tube comprises a silicone.

18. The simulant of claim 1, wherein each said plate comprises a urethane.

* * * * *